US011057735B2

(12) United States Patent
Mehrhoff et al.

(10) Patent No.: US 11,057,735 B2
(45) Date of Patent: Jul. 6, 2021

(54) SYSTEMS AND METHODS FOR TRIGGERING LOCATION-BASED MOBILE DEVICE EVENTS USING GEO-FENCING

(71) Applicant: MASTERCARD INTERNATIONAL INCORPORATED, Purchase, NY (US)

(72) Inventors: Shawn Mehrhoff, Saint Ann, MO (US); Madeline Mueller, St. Paul, MO (US); Christopher T. Scholl, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/692,794

(22) Filed: Nov. 22, 2019

(65) Prior Publication Data

US 2021/0160652 A1 May 27, 2021

(51) Int. Cl.

*H04W 4/021* (2018.01)
*H04W 4/029* (2018.01)
*G06Q 20/40* (2012.01)
*G06Q 30/02* (2012.01)
*H04L 29/08* (2006.01)
*H04W 4/02* (2018.01)

(52) U.S. Cl.

CPC ............ *H04W 4/021* (2013.01); *G06Q 20/40* (2013.01); *G06Q 30/02* (2013.01); *H04L 67/18* (2013.01); *H04W 4/023* (2013.01); *H04W 4/029* (2018.02)

(58) Field of Classification Search

CPC ..... H04W 4/021; H04W 4/029; H04W 4/023; H04L 67/18; G06Q 20/40

USPC ...................................................... 455/456.1

See application file for complete search history.

(56) References Cited

U.S. PATENT DOCUMENTS

| | | | | |
|---|---|---|---|---|
| 10,217,164 | B2 | 2/2019 | Mylet et al. | |
| 10,278,014 | B2 | 4/2019 | Liang et al. | |
| 2008/0270204 | A1* | 10/2008 | Poykko | G06Q 30/0204 705/7.29 |
| 2010/0268618 | A1 | 10/2010 | McQuilken | |
| 2011/0060600 | A1 | 3/2011 | Fox et al. | |
| 2011/0136468 | A1 | 6/2011 | McNamara et al. | |
| 2012/0265585 | A1 | 10/2012 | Muirbrook et al. | |
| 2014/0067490 | A1* | 3/2014 | James | G06Q 30/0284 705/13 |
| 2014/0180710 | A1 | 6/2014 | Mitchley et al. | |

(Continued)

*Primary Examiner* — William Nealon

(74) *Attorney, Agent, or Firm* — Armstrong Teasdale LLP

(57) ABSTRACT

A transportation controller (TC) computing system for monitoring a user computing device location and triggering location-based events using geo-fencing is provided. The TC computing system includes at least one TC computing device configured to register a customer with a transportation controller (TC) service using registration data received from a user computing device associated with the customer. The TC computing device is also configured to receive, in response to the user computing device detecting a first geo-fence, first travel data associated with a trip of the customer. The TC computing device is further configured to validate the trip using the first travel data, receive, in response to the user computing device detecting a second geo-fence, second travel data associated with the trip of the customer, and determine a first transaction amount for the trip based on the first travel data and the second travel data.

20 Claims, 8 Drawing Sheets

(56) References Cited

U.S. PATENT DOCUMENTS

2014/0278616 A1* 9/2014 Stone ................. G06Q 30/0283
705/6
2015/0134428 A1 5/2015 Li et al.
2015/0294298 A1 10/2015 Michishita et al.
2016/0189067 A1* 6/2016 Law ....................... G06Q 10/06
705/34
2016/0292679 A1* 10/2016 Kolin ..................... G06Q 50/30
2017/0098210 A1* 4/2017 Laracey ............. G06Q 20/3224
2017/0178117 A1 6/2017 McClard et al.
2019/0075425 A1* 3/2019 Lynch ................... H04W 12/12
2019/0116466 A1 4/2019 Hernoud et al.
2019/0122447 A1 4/2019 Shah

* cited by examiner

SYSTEMS AND METHODS FOR TRIGGERING LOCATION-BASED MOBILE DEVICE EVENTS USING GEO-FENCING

BACKGROUND

This disclosure relates generally to geo-fencing and, more specifically, to systems and methods for monitoring computing device location and triggering location-based events using geo-fencing.

Many service providers, and therefore the customers receiving services from those service providers, benefit from knowing the location of the customer. Certain services can be provided in a more timely, accurate, efficient, and/or targeted manner, when a precise location of the customer is determinable electronically.

For example, an issuing bank service provider may be able to more easily detect and prevent fraudulent transactions when the issuing bank service provider knows the current location of an actual cardholder associated with a payment card being used to initiate the transactions. Another example may include transportation service providers (e.g., ride sharing services) that utilize transportation systems that may provide more timely service when these systems are able to identify the precise actual location of the customers seeking transportation services via electronic signals.

Even though these known transportation systems enable electronically identifying the actual location of customers, these customers typically have to manually enter or actively accept an identifier (e.g., street address) of where they are located. Additionally, if the customers are sharing the service, each has to manually specify that the service is going to be shared and, when the end location of each customer is different, each customer has to manually specify his or her respective end location. Furthermore, these known transportation systems are not able to aggregate trips combining different types of transportation services (e.g., ride sharing services, taxi services, subway services, bus services).

A system that permits automatic identification of the actual locations of customers as well as more nuanced and customized sharing features and aggregation of multiple types of transportation services is desired.

BRIEF DESCRIPTION

In one aspect, a transportation controller (TC) computing system for monitoring computing device location and triggering location-based events using geo-fencing is provided. The TC computing system includes at least one transportation controller (TC) computing device including at least one processor configured to register a customer with a transportation controller (TC) service using registration data received from a user computing device associated with the customer. The at least one processor is also configured to receive, from the user computing device in response to the user computing device detecting a first geo-fence, first travel data associated with a trip of the customer, and validate the trip using the first travel data. The at least one processor is further configured to receive, from the user computing device in response to the user computing device detecting a second geo-fence, second travel data associated with the trip of the customer, and determine a first transaction amount for the trip based on the first travel data and the second travel data.

In another aspect, a computer-implemented method monitoring computing device location and triggering location-based events using geo-fencing is provided. The method is implemented by at least one transportation controller (TC) computing device that includes at least one processor in communication with a database. The method includes registering a customer with a transportation controller (TC) service using registration data received from a user computing device associated with the customer. The method also includes receiving, from the user computing device in response to the user computing device detecting a first geo-fence, first travel data associated with a trip of the customer, and validating the trip using the first travel data. The method further includes receiving, from the user computing device in response to the user computing device detecting a second geo-fence, second travel data associated with the trip of the customer, and determining a first transaction amount for the trip based on the first travel data and the second travel data.

In yet another aspect, a non-transitory computer readable medium that includes computer-executable instructions embodied thereon is provided. When the computer-executable instructions are executed by at least one transportation controller (TC) computing device that includes at least one processor in communication with a database, the computer-executable instructions cause the TC computing device to register a customer with a transportation controller (TC) service using registration data received from a user computing device associated with the customer The computer-executable instructions also cause the TC computing device to receive, from the user computing device in response to the user computing device detecting a first geo-fence, first travel data associated with a trip of the customer, and validate the trip using the first travel data. The computer-executable instructions further cause the TC computing device to receive, from the user computing device in response to the user computing device detecting a second geo-fence, second travel data associated with the trip of the customer, and determine a first transaction amount for the trip based on the first travel data and the second travel data.

BRIEF DESCRIPTION OF THE DRAWINGS

FIG. 1 is a schematic diagram illustrating an example transportation controller (TC) computing system for monitoring mobile device location and triggering location-based mobile device events using geo-fencing over a communications network.

FIG. 2 is an example data flow diagram for a pre-purchased trip implemented using the TC computing system shown in FIG. 1.

FIG. 3 is an example data flow diagram for an on-site purchase of a trip implemented using the TC computing system shown in FIG. 1.

FIG. 4 is a schematic diagram illustrating an example multi-party payment processing system for enabling payment-by-card transactions.

FIG. 5 illustrates an example configuration of a user computing device shown in FIG. 1, in accordance with one embodiment of the present disclosure.

FIG. 6 illustrates an example configuration of server components for monitoring mobile device location and triggering location-based mobile device events using geo-fencing over a communications network shown in FIGS. 1 and 2.

FIG. 7 is a flow chart of an example process monitoring mobile device location and triggering location-based mobile device events using geo-fencing over a communications network shown in FIGS. 1 and 2.

FIG. 8 is a diagram of components of one or more example computing devices that may be used in the TC computing system shown in FIG. 1.

DETAILED DESCRIPTION

Figure 1:
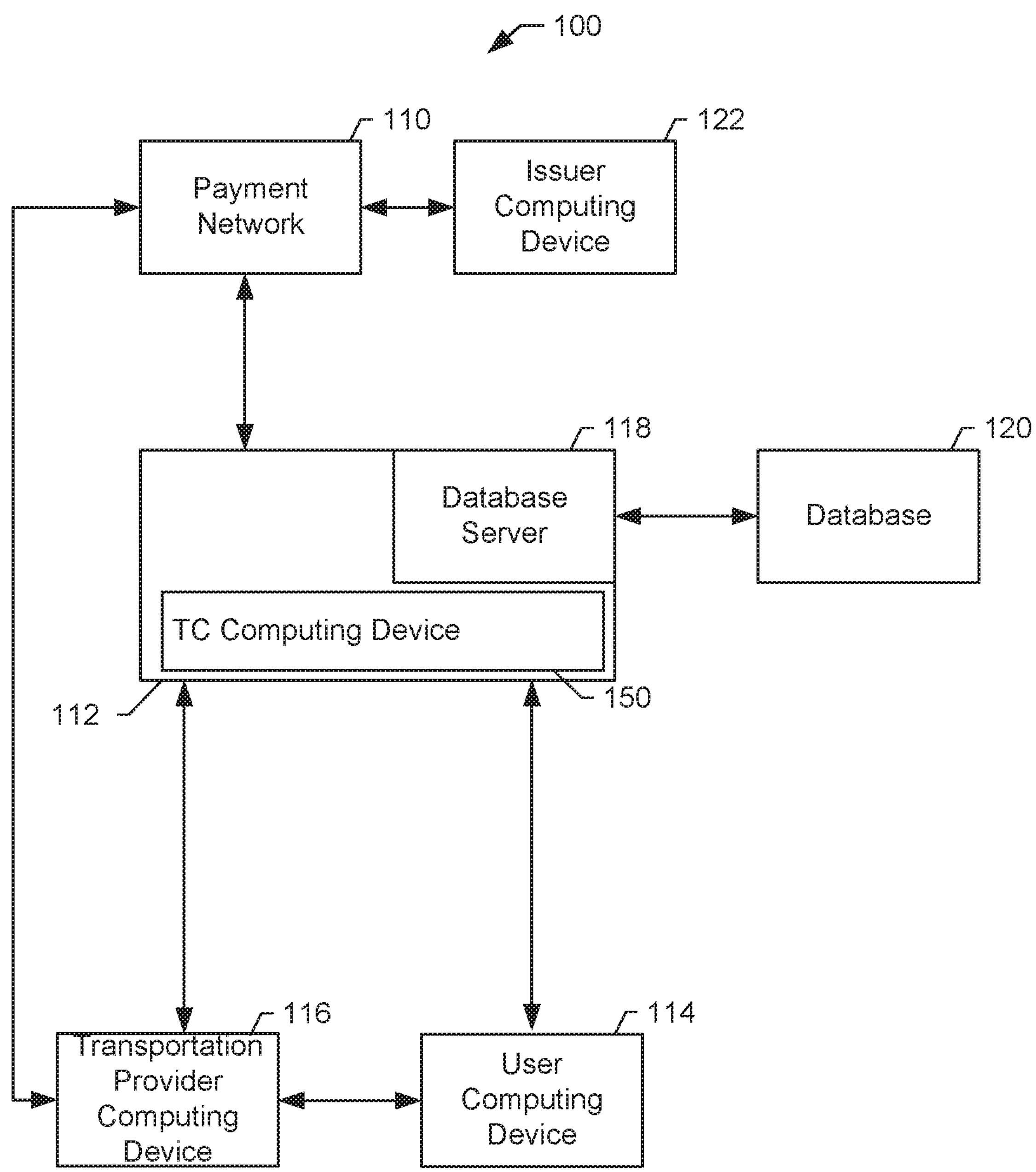
FIGS. 1-8 show example embodiments of the methods and systems described herein.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

A transportation controller (TC) computing system configured to provide a TC service is described herein. The TC service leverages the ability of computing devices (e.g., mobile devices) to detect entry into, or exit from, a predefined geographic area (i.e., crossing of a "geo-fence") associated with a transportation provider to purchase and validate transportation tickets. In other words, the TC service streamlines the purchasing process for electronic transportation tickets at different places and times. In one example, a user may purchase a ticket in advance of planned travel and add the ticket the user's computing device wallet. In this case, the ticket may automatically be validated when the user crosses the geo-fence. In another example, a user may purchase a ticket contemporaneously with the onset of the travel in response to crossing a geo-fence associated with the transportation provider. In this case, the user's computing device may detect the geo-fence and automatically purchase the ticket without intervention from the user. In yet another example, a user may purchase a ticket when exiting a transportation provider geo-fence. That is, when the user exits the transportation provider geo-fence, the user's computing device detects that the user is exiting and, in response, the user's computing device automatically purchases the ticket. The user's computing device may be configured to keep track of the location of the user and compute the cost of the ticket based on the duration of the trip and/or distance travelled by the user. The geo-fence may be stationary (e.g., a subway station entry portal) or mobile (e.g., the inside of a ride-share automobile). The TC service also facilitates splitting transportation fares between users, as described in more detail below.

In the example embodiment, the TC computing system includes at least one TC computing device in communication with at least one transportation provider computing device, at least one issuer computing device via a payment network, and/or at least one user computing device. The TC computing device is further in communication with at least one database that may store and/or process data, such as travel data and registration data.

The term "geo-fence", as used herein, refers generally to a defined geographic region or area. The bounded area may be substantially circular, substantially polygonal, or any other shape. A geo-fence can be defined by reference to a perimeter, or boundary, surrounding an area, and may be virtual (e.g., defined solely in terms of geographic coordinates or referenced to a geolocation signal) and/or coincide with a physically defined perimeter. The geo-fence may bound a physically static area, or may bound all or part of an object that moves (e.g., an interior of vehicle, a train, or other mode of transportation). In some embodiments of the present disclosure, at least one geo-fence surrounds public transportation infrastructure, such as an airport terminal or subway station. Additionally or alternatively, in certain embodiments, at least one geo-fence encapsulates a passenger compartment of a public transportation vehicle, such as a taxicab. In response to a user of public transportation crossing a geo-fence (e.g., passing through a subway station turnstile or entering a ride-share automobile), an application on the user's mobile computing device (e.g., smart phone) detects the crossing as a location-based event, initiating communication between multiple computing devices to automatically track and/or charge for the user's travel, as described further below.

In some embodiments, the use of location-based mobile device events triggered by geo-fencing enables the systems and methods described herein to automatically present the traveler with a unified itinerary, ticket validation process, payment processing, and/or billing summary for a trip involving multiple modes of transportation. For example, a user may take a ride-share vehicle from a residence to a first train station, take a train from the first train station to the second train station, and take a taxicab from the second train station to an ultimate destination. The application on the user's mobile computing device detects a crossing of the geo-fence associated with the ride share vehicle upon the user's entry into, and exit from, the ride share vehicle and automatically tracks the route and charges the user's payment account in accordance the distance traveled in the ride share vehicle; detects a crossing of the geo-fence associated with the first train station and a crossing of the geo-fence associated with the second train station and automatically tracks the route and charges the user's payment account for the station-to-station travel in the train; and detects a crossing of the geo-fence associated with the taxicab upon the user's entry into, and exit from, the taxicab and automatically tracks the route and charges the user's payment account for the distance traveled in the taxicab. The system may report a trip summary and total charge for all three legs of the trip to the user, while automatically initiating separate payment transactions with the ride-share company, the train company, and the taxicab company for the appropriate amount for each leg of travel. Moreover, the system may allow the user to purchase in advance and store a ticket for, for example, the train leg of the trip, and the crossing of the geo-fence may trigger a use validation of the pre-purchased train ticket, while the taxicab purchase may be extemporaneous and the cost open-ended pending completion of the taxicab leg of the trip.

Additionally or alternatively, in certain embodiments, the use of location-based mobile device events triggered by geo-fencing enables the systems and methods described herein to automatically split transportation costs for multiple travelers who share all or part of a trip. For example, if two users share a ride-share vehicle from point A to point B, a first user exits at point B, and the second user continues on in the ride-share vehicle to point C, the system uses the geo-fence crossings (i.e., entry into and exit from the ride-share vehicle) for each user to automatically allocate the relative charges incurred by each user for the overall trip and to automatically initiate the respective charge to each user's payment account over a payment processing network.

As used herein, the term "location" or "geolocation" refers to tracking a customer location as collected from a user computing device's location system, such as a global positioning system (GPS) sensor, and can include GPS coordinates, a street address, an IP address, geo-stamps on digital photographs, smartphone check-in or other data, and other location data provided as a result, for example, of a telecommunications or online activity of a customer using the user computing device. In some embodiments, the location of the user computing device may be determined using the device's location systems and may be supplemented and/or verified using cell tower info (e.g., cell "pings") and/or WI-FI router information (e.g., connected routers used by the user computing device). The user computing device may include a web-enabled phone (e.g., a "smartphone"), a personal digital assistant (PDA), a laptop computer, a cellular phone, a tablet, a phablet, or other web-based connectable equipment the customer may use to communicate with other computing devices.

In the example embodiment, a customer may register (e.g., sign up) with the TC service via a network (e.g., Internet network) using the user computing device. The customer may access the TC service via a website or a software application (the website and the software application are also referred to herein as a TC application) included in the user computing device. The TC application is provided by the TC computing device, which configures the TC application to include computer-executable code that is downloadable by the user computing device to establish communication with one or more transportation provider computing devices. Once the customer accesses the TC service, the customer may register for the service by inputting registration data. The registration data may be also inputted by the customer as part of a trip purchasing process, as described below.

The registration data may include, among other data, a customer identifier, customer authentication credentials, also referred to herein as login data (e.g., customer name, password, biometric data, security questions, security answers, or the like), customer account data (e.g., primary account number (PAN), bank identification number (BIN), or other account related information), a user computing device identifier, a customer email address, a customer home address, a customer work address, a customer phone number, and/or other data associated with the customer.

In some embodiments, the registration data is anonymized and aggregated (e.g., by the user computing device) prior to receipt by the TC computing device (i.e., no personally identifiable information (PII) is received by the TC computing device). In other embodiments, the TC computing device may be configured to receive registration data not yet anonymized, and thus the TC computing device may be configured to anonymize and aggregate the registration data. In such embodiments, any PII received by the TC computing device is received and processed in an encrypted format, or is received with the consent of individuals with which the PII is associated. In situations in which the systems discussed herein collect personal information about individuals including customers, or may make use of such personal information, individuals may be provided with an opportunity to control whether such information is collected or to control whether and/or how such information is used. In addition, certain data may be processed in one or more ways before it is stored or used, so that personally identifiable information is removed.

In the example embodiment, a transportation provider (e.g., a merchant) may also register (e.g., sign up) with the TC service via a network (e.g., Internet network) using a transportation provider computing device. In some embodiments, the transportation provider computing device may be similar to the user computing device. In other embodiments, the transportation provider computing device may be a point-of-sale (POS) terminal. The transportation provider may access the TC service via a website or a software application (the website and the software application are also referred to herein as a TC application) included in the transportation provider computing device. The TC application is provided by the TC computing device, which configures the TC application to include computer-executable code that is downloadable by the transportation provider computing devices to establish communication with one or more user computing devices. Once the transportation provider accesses the TC service, the transportation provider may register for the TC service by inputting merchant data.

In the example embodiment, the merchant data may include, among other data, a merchant identifier, a merchant name, a merchant address, a transportation provider computing device identifier, fare fee data (e.g., fare fee data relating to fees charged per travel distance/time by a customer), a merchant type (e.g., type of transportation provider), merchant account data (e.g., merchant bank or acquirer bank information, or other account related information), and metadata associated with each merchant location (e.g., hours of operation, applicable sales taxes, merchant-imposed fees, among other metadata associated with each merchant location).

In the example embodiment, the travel data may include, among other data, a trip distance, geo-fence location identifiers identifying locations where the customer crossed transportation providers' geo-fences (e.g., entry geo-fence ID, exit geo-fence ID), date and time for each customer trip, duration of each customer trip, and/or transaction data including a transaction amount (e.g., fare fee, a purchase amount), a time and date of the transaction, customer account data (e.g., a primary account number (PAN)), customer biometric data (e.g., native or hashed version of biometric data), a customer identifier, a merchant identifier, a transportation provider computing device identifier, a location of the point-of sale of the transaction, an authentication request message, an authorization request message, a user computing device identifier, and/or other data associated with the payment transaction.

In the example embodiment, once the customer and the transportation provider are registered with the TC service, the customer may purchase tickets or trips from the transportation provider using the TC service. In one example, the customer may purchase a trip from a remote location (e.g., a location outside the transportation provider's geo-fence). In this example, the customer initiates the purchase by accessing the TC service via, for example, a TC application. The customer may initiate the purchase by inputting login data and travel data into the TC application. For example, the customer may input login data including a username, a password, biometric data, and/or other information associated with the customer for authentication by the TC computing device against previously submitted registration data of the customer. The customer may also input travel data including a number of trips, the departure location, the destination location, the transportation provider identification, the date and time of departure, and/or other information related to the trip. The inputted login data and travel data are transmitted by the user computing device to the TC computing device.

In another example, the customer may purchase a trip at a transportation provider's location (a location at or inside the transportation provider's geo-fence). In this example, the customer may initiate the purchase, as described above, or the user computing device may automatically initiate the purchase by accessing the TC service via the TC application upon the user computing device detecting the transportation provider's geo-fence and establishing communication with the transportation provider computing device. The user computing device may detect the transportation provider's geo-fence and establish communication with the transportation provider computing device using communication network signals, such as a local area network (LAN) or a wide area network (WAN), dial-in connections, cable modems, wireless modems, cellular communications, and special high-speed ISDN lines, Raspberry Pi, BLE (Bluetooth™® Low-Energy), Wi-Fi, near field communications (NFC), infrared, and ZIGBEE® (e.g., ZigBee Smart Energy 1.0, ZigBee Smart Energy 2.0. ZIGBEE® is a registered trademark of ZigBee Alliance, Inc., of San Ramon, Calif.). In some embodiments, the user computing device establishes a direct communication with the transportation provider computing device, which communicates with the TC computing device. In other embodiments, the user computing device establishes communication with the transportation provider computing device via the TC computing device.

In some embodiments, in response to the user computing device detecting the transportation provider's geo-fence and/or establishing communication with the transportation provider computing device, the user computing device may prompt the customer to enter or confirm the login data. Upon entry or confirmation of the login data, the user computing device may purchase the trip on behalf of the customer.

In other embodiments, in response to the user computing device detecting the transportation provider's geo-fence and/or establishing communication with the transportation provider computing device, the user computing device may automatically purchase the trip on behalf of the customer, without receiving input from the customer at the time of purchase. In these embodiments, the user computing device is configured to initiate the purchase in response to the user computing device, using the TC application, automatically detecting the transportation provider's geo-fence. For example, the user computing device automatically purchases the trip in response to the customer physically embarking on the trip. In response to the user computing device detecting the transportation provider's geo-fence, the user computing device accesses the TC application to initiate the purchase of the trip. The user computing device may initiate the purchase using login data and travel data. The login data and travel data may be transmitted via data files. In one example, the login data may have been previously received and stored by the user computing device (e.g., as part of the registration process, or customer update information process). In this case, the user computing device may automatically submit the login data to the TC computing device directly or via the transportation provider computing device.

In embodiments where the user computing device automatically initiates the purchase of the trip, the user computing device is configured to transmit login data to the transportation provider computing device. Subsequently, the transportation provider computing device transmits the travel data to the TC computing device for verification or authentication of the customer's credentials. Upon verifying the customer, the TC computing device transmits back the login data, including a verification response, to the transportation provider computing device, which then transmits travel data, directly or via the TC computing device, to the user computing device. For example, the user computing device may receive travel data, such as geo-fence location identifiers identifying locations where the customer crossed transportation providers' geo-fences (e.g., entry geo-fence ID, exit geo-fence ID), date and time for each customer trip, duration of each customer trip, and/or transaction data including a transaction amount (e.g., fare fee). Once the travel data is received, the user computing device is configured to transmit, directly or via the transportation provider computing device, the travel data and the login data to the TC computing device.

In the example embodiment, in response to the TC computing device receiving the travel data and login data, the TC computing device may store the received data within a TC database. The TC computing device may also transmit data associated with the transaction to a payment card interchange network for processing the transaction associated with the trip(s) being purchased.

In some embodiments, during or at completion of the purchasing process, the TC computing device may instruct the TC application to store the travel data within the user computing device's digital wallet. In other embodiments, during the duration of the trip or at completion of the trip (e.g., at the time or after the user computing device exits the transportation provider's geo-fence), the TC computing device may instruct the TC application to store the travel data within the user computing device's digital wallet. The travel data may be stored in the digital wallet in the form of a digital ticket pass.

In some embodiments, during the purchasing process or alternatively during the trip or at completion of the trip (e.g., at or after the time the user computing device exits the transportation provider's geo-fence), the TC computing device may instruct the TC application to establish communication with a transportation provider's software application and transmit the travel data present on the user computing device to the transportation provider's software application, which stores the travel data. In other embodiments, the TC computing device may instruct the TC application to store the travel data in any fashion that enables the trip to be validated when the user computing device detects the transportation provider's geo-fence.

In some embodiments, the transportation provider computing device is configured to validate a pre-purchased trip by receiving travel data of a purchased trip from a user computing device. The user computing device may establish communication with the transportation provider computing device via wireless signals, as described above, and/or via the TC computing device using a network, such as the Internet. Once the communication is established, the user computing device is configured to automatically transmit the travel data of the pre-purchased trip to the transportation provider computing device. Subsequently, the transportation provider computing device may parse the received the travel data to determine whether the pre-purchased trip is valid, for example, by identifying the date and time of the trip. In one example, a trip including a departure of Apr. 20, 2019 may not be validated on Apr. 19, 2019. Similarly, a trip including a departure date and time that has expired cannot be validated. In another example, the transportation provider computing device may validate only trips that start/depart after a predefined period of time. In this case, for example, a trip including a departure of Apr. 20, 2019 at 2:00 p.m. may not be validated before Apr. 20, 2019 at 8:00 a.m.

In embodiments where a trip is purchased, either by a customer input or automatically by the user computing device, upon entrance to the transportation provider, the trip may be validated at the time of purchase by the transportation provider computing device. In these embodiments, the user computing device is configured to transmit travel data, including transaction data, to the TC computing device directly or via the transportation provider computing device. Once the TC computing device receives the travel data, the TC computing device is configured to parse the travel data to identify the transaction data, which is transmitted by the TC computing device to a payment card interchange network for processing the purchase (e.g., the transaction), as described below. The transaction data may be transmitted in the form of an authorization request message over a payment card interchange network. In response to transmitting the authorization request message, the TC computing device receives an authorization response message from the payment card interchange network. The TC computing device transmits the authorization response message to the transportation provider computing device and/or to the user computing device directly or via the transportation provider computing device. In other embodiments, the transportation provider computing device validates the trip once the authorization response message is received from the TC computing device either directly or via the user computing device.

In certain embodiments, a customer may purchase a closed trip or an open trip. The term "closed trip", as used herein, refers generally to a trip which a destination location has been set. The term "open trip", as used herein, refers generally to a trip for which a destination location has not been set. For example, a customer may purchase an open trip either ahead of time or upon entrance at the transportation provider location. The open trip is validated after the user computing device detects a transportation provider's geo-fence, as described above, and the customer initiates the trip. In the case of an open trip, the trip is validated using a pre-authorization response message. That is, the pre-authorization response message places a hold on the customer's account for a specified amount based on a projected purchase amount. For example, a customer and/or a transportation provider may set the specified amount with the TC computing device at the time of registration, at the time of purchasing a trip, and/or at the time of updating customer or transportation provider information with the TC service. Once the customer initiates the trip, the user computing device, using the TC application, is configured to track the location of the user computing device and verify that the user computing device remains inside the transportation provider's geo-fence. Once the user computing device, using the TC application, detects that the user computing device is exiting the transportation provider's geo-fence, the user computing device is configured to record the exit location (e.g., the destination location of the trip) as part of the travel data. The TC application is configured to transmit the destination location and any additional remaining travel data to the TC computing device directly or via the transportation provider computing device. The TC computing device stores the destination location as part of the travel data.

In the example embodiment, the TC computing device is configured to compute the purchase amount of the trip using the travel data, and particularly the destination location (e.g., the destination location may be known when the trip is purchased or at the time the customer exits the transportation provider's geo-fence in the case of an open trip). In some embodiments, the TC computing device is configured to transmit the computed purchase amount to the payment card interchange network for processing the purchase in response to receipt of each destination location. In other embodiments, the TC computing device is configured to periodically transmit the computed purchase amount for a plurality of trips completed by a customer during a predefined period of time (e.g., a few hours, a day, few days, a week, etc.). For example, a customer, who desires to go from point A to point D, may have to enter and exit several transportation providers' geo-fences, for example at points B and C, to arrive at point D. In this example, the TC computing device is configured to receive travel data when the customer enters a first geo-fence at point A, exits the first geo-fence at point B (e.g., a first leg of the trip), enters a second geo-fence at point C, and exits the second geo-fence at point D (e.g., a second leg of the trip). In some embodiments, the customer may use the same transportation provider throughout the trip. In other embodiments, the customer may use different transportation providers throughout the trip.

In one example, the transportation provider may be a subway system. In one example, a customer desiring to ride the subway may purchase the subway ticket ahead of time using the TC service. The user computing device (e.g., mobile device) of the customer stores the ticket into a digital wallet. When the customer enters the subway's geo-fence, the mobile device may detect, using the TC application, the subway's geo-fence and establish communication with a transportation provider computing device (e.g., a subway computing device) via wireless signals or via the TC computing device, as discussed above. The mobile device is configured to transmit, via the wireless signals or the TC computing device, travel data associated with the purchased ticket to the subway computing device. In the example embodiment, the TC computing device validates the purchased ticket, generates validation data upon determining that the ticket is valid for use, and transmits the validation data to the mobile device via the subway computing device, or separately to the mobile device and the subway computing device. In some embodiments, the subway computing device, in response to receiving the travel data, validates the purchased ticket, generates the validation data, and transmits the validation data to the mobile device directly or via the TC computing device.

In another example, when a customer desiring to ride the subway does not purchase the subway ticket ahead of time, the customer may purchase the ticket at the subway station via the user computing device. As described above, when the customer enters the subway's geo-fence, the user computing device may detect the subway's geo-fence and establish communication with the subway computing device via wireless signals or via the TC computing device. The TC application on the user computing device may automatically purchase an open ticket from the subway computing device, or may prompt the customer to confirm the purchase. In this example, the subway computing device or the TC computing device may receive, from the user computing device, an authorization request message including the confirmation of purchase. In response to receiving the authorization request message, the subway computing device or the TC computing device may transmit the authorization request message to a payment network, which transmits the authorization request message to an issuer computing device for processing (e.g., approval or denial of the transaction/purchase). In response to processing the authorization request message, the issuer computing device generates and transmits an authorization response message to the subway computing device and/or the TC computing device via the payment network. The authorization response message includes an approval or denial. The subway computing device or the TC computing device may validate the ticket at the time of purchase, generate validation data upon determining that the ticket is valid for use, and transmit the validation data with the authorization response message to the user computing device.

In yet another example, the transportation provider may be a ride sharing provider (e.g., Uber®, Lyft®). In one example, a customer desiring to use a ride sharing vehicle may purchase the trip ahead of time using the TC service or a software application of the ride sharing provider (e.g., ride sharing application). The user computing device (e.g., mobile device) of the customer stores the trip information into a digital wallet or the ride sharing application. Subsequently, the customer may request a ride sharing vehicle using the TC application or the ride sharing application. When the customer enters the ride sharing provider's geo-fence (e.g., the customer is proximate and/or enters the ride sharing provider's vehicle), the user computing device may detect, using the TC application, the ride sharing provider's geo-fence and establish communication with a transportation provider computing device (e.g., a ride sharing computing device) via wireless signals or via the TC computing device, as discussed above. The user computing device is configured to transmit, directly or via the TC computing device using the communication network signals, travel data associated with the purchased ticket to the ride sharing computing device. In the example embodiment, the TC computing device validates the purchased trip, generates validation data upon determining that the ticket is valid for use, and transmits the validation data to the user computing device via the ride sharing computing device, or separately to the user computing device and the ride sharing computing device. In some embodiments, the ride sharing computing device, in response to receiving the travel data, validates the purchased trip, and transmits validation data to the user computing device directly or via the TC computing device.

In another example, when a customer desiring to get a ride sharing vehicle does not purchase the trip ahead of time, the customer may purchase the trip at the ride sharing provider's geo-fence via the user computing device. As described above, when the customer enters the ride sharing provider's geo-fence, the mobile device may detect the ride sharing provider's geo-fence and establish communication with the ride sharing computing device via wireless signals or via the TC computing device. In this example, the ride sharing computing device or the TC computing device may validate the ticket at the time of purchase, generate validation data upon determining that the ticket is valid for use, and transmit the validation data with the authorization response message to the user computing device.

As described above, the TC application is configured to track the user computing device location to verify whether the user computing device remains within the transportation provider's geo-fence. Whether the transportation provider is a subway system, a ride sharing provider, or other type of transportation provider, the TC computing system is configured to track each leg of a customer's trip and aggregate the travel data. Stated differently, the TC computing system enables each customer to ride the same or different transportation providers while keeping track of each leg for each customer. For example, two customers (e.g., a first customer and a second customer) may ride a subway from point A to point B, and get a vehicle from a ride sharing provider from point C to point E. However, if the first customer is dropped off at point D, which is between point C and E, and the second customer is dropped off at point E, the trip of the first customer would include points A, B, C, and D, whereas the trip of the second customer would include points A, B, C, D, and E. Therefore, each customer would purchase a trip according to each respective leg of the trip.

The systems and method described herein include: a customer consenting to the monitoring of the location of his/her user computing device; a "geo-fence" being generated based on service provider rules that encompass the locations where the customer starts and/or ends using a transportation provider (e.g., activation/deactivation of geo-fences); and automatic recording and purchase of trips and fares. When the user computing device enters and/or exits the geo-fence, the user computing device is triggered to track and record the location of the customer which is transmitted to the TC computing device configured to compute the fare amount for each trip based on the received location.

A technical effect of the systems and processes described herein is achieved by performing at least one of: (a) registering a customer with a transportation controller (TC) service using registration data received from a user computing device associated with the customer; (b) receiving, from the user computing device in response to the user computing device detecting a first geo-fence, first travel data associated with a trip of the customer; (c) validating the trip using the first travel data; (d) receiving, from the user computing device in response to the user computing device detecting a second geo-fence, second travel data associated with the trip of the customer; and (e) determining a first transaction amount for the trip based on the first travel data and the second travel data.

The technical effects and advantages achieved by this system is at least one of: (a) improved accuracy of location tracking of user computing devices using internal GPS sensors n geo-fencing technology, (b) location tailored to specific customers to customize trips for every customer, (c) reduced or eliminated dependence on mobile network operators to determine mobile device location, and (d) reducing time to validate trips by automatically detecting transportation providers' geo-fences.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example transportation controller (TC) computing system 100 for monitoring mobile device location and triggering location-based mobile device events using geo-fencing over a communications network. The TC computing system 100 includes at least one TC computing device 150 in communication with at least one transportation provider computing device 116, at least one issuer computing device 122 via a payment network 110, and/or at least one user computing device 114. TC computing device 150 is further in communication with at least one database 120 that may store and/or process data, such as travel data and registration data. A database server 118 may be in communication with database 120, which contains information on a variety of matters, as described below in greater detail. In one embodiment, database 120 is stored on server 112 and may be accessed by logging onto server 112 an/or TC computing device 150 through user computing device 114 or transportation provider computing device 116. In an alternative embodiment, database 120 is stored remotely from server 112 and may be non-centralized.

In the example embodiment, a customer may register (e.g., sign up) with the TC service via a network (e.g., Internet network) using user computing device 114. The customer may access the TC service via a TC application. Once the customer accesses the TC service, the customer may register for the service by inputting registration data. The registration data may be also inputted by the customer as part of a trip purchasing process, as described below.

In the example embodiment, a transportation provider (e.g., a merchant) may also register (e.g., sign up) with the TC service via a network (e.g., Internet network) using transportation provider computing device 116. In some embodiments, transportation provider computing device 116 may be similar to user computing device 114. In other embodiments, transportation provider computing device 116 may be a point-of-sale (POS) terminal. The transportation provider may access the TC service via a TC application. Once the transportation provider accesses the TC service, the transportation provider may register for the TC service by inputting merchant data.

In the example embodiment, once the customer and the transportation provider are registered with the TC service, the customer may purchase tickets or trips from the transportation provider using the TC service. In one example, the customer may purchase a trip from a remote location (e.g., a location outside the transportation provider's geo-fence). In this example, the customer initiates the purchase by accessing the TC service via, for example, a TC application. The customer may initiate the purchase by inputting login data and travel data into the TC application. For example, the customer may input login data including a username, a password, biometric data, and/or other information associated with the customer for authentication by TC computing device 150 against previously submitted registration data of the customer. The customer may also input travel data including a number of trips, the departure location, the destination location, the transportation provider identification, the date and time of departure, and/or other information related to the trip. The inputted login data and travel data are transmitted by user computing device 114 to TC computing device 150.

In another example, the customer may purchase a trip at a transportation provider's location (a location at or inside the transportation provider's geo-fence). In this example, the customer may initiate the purchase, as described above, or user computing device 114 may automatically initiate the purchase by accessing the TC service via the TC application upon user computing device 114 detecting the transportation provider's geo-fence and establishing communication with transportation provider computing device 116. User computing device 114 may detect the transportation provider's geo-fence and establish communication with transportation provider computing device 116 using communication network signals, such as a local area network (LAN) or a wide area network (WAN), dial-in connections, cable modems, wireless modems, cellular communications, and special high-speed ISDN lines, Raspberry Pi, BLE (Bluetooth™® Low-Energy), Wi-Fi, near field communications (NFC), infrared, and ZIGBEE® (e.g., ZigBee Smart Energy 1.0, ZigBee Smart Energy 2.0. ZIGBEE® is a registered trademark of ZigBee Alliance, Inc., of San Ramon, Calif.). In some embodiments, user computing device 114 establishes a direct communication with transportation provider computing device 116, which communicates with TC computing device 150. In other embodiments, user computing device 114 establishes communication with transportation provider computing device 116 via TC computing device 150.

In some embodiments, in response to user computing device 114 detecting the transportation provider's geo-fence and/or establishing communication with transportation provider computing device 116, user computing device 114 may prompt the customer to enter or confirm the login data. Upon entry of confirmation of the login data, user computing device 114 may purchase the trip on behalf of the customer.

In other embodiments, in response to user computing device 114 detecting the transportation provider's geo-fence and/or establishing communication with transportation provider computing device 116, user computing device 114 may automatically purchase the trip on behalf of the customer, without receiving input from the customer at the time of purchase. In these embodiments, user computing device 114 is configured to initiate the purchase in response the user computing device 114, using the TC application, detecting the transportation provider's geo-fence. For example, user computing device 114 automatically purchases the trip in response to the customer physically embarking on the trip. In response to user computing device 114 detecting the transportation provider's geo-fence, user computing device 114 accesses the TC application to initiate the purchase of the trip. User computing device 114 may initiate the purchase using login data and travel data. In one example, the login data may have been previously received and stored by user computing device 114 (e.g., as part of the registration process, or customer update information process). In this case, user computing device 114 may automatically submit the login data to TC computing device 150 directly or via transportation provider computing device 116.

In one example, the transportation provider may be a subway system. A customer desiring to ride the subway may purchase the subway ticket ahead of time using the TC service. User computing device 114 (e.g., mobile device) of the customer stores the ticket into a digital wallet. When the customer enters the subway's geo-fence, user computing device 114 may detect, using the TC application, the subway's geo-fence and establish communication with transportation provider computing device 116 (e.g., a subway computing device) directly or via TC computing device 150 using communication network signals, as discussed above. User computing device 114 is configured to transmit, directly or via TC computing device 150 using the communication network signals, travel data associated with the pre-purchased ticket to transportation provider computing device 116. In the example embodiment, TC computing device 150 validates the pre-purchased ticket, generates validation data upon determining that the ticket is valid for use, and transmits the validation data to the user computing device 114 via transportation provider computing device 116, or separately to the user computing device 114 and transportation provider computing device 116. In some embodiments, transportation provider computing device 116 in response to receiving the travel data, validates the purchased ticket and transmits validation data to user computing device 114 directly or via TC computing device 150.

In another example, when a customer desiring to ride the subway does not purchase the subway ticket ahead of time, the customer may purchase the ticket at the subway station via user computing device 114. When the customer enters or is at the subway's geo-fence, user computing device 114 may detect the subway's geo-fence and establish communication with transportation provider computing device 116 directly or via TC computing device 150 using the communication network signals. The TC application on user computing device 114 may automatically purchase an open ticket from the transportation provider computing device 116, or may prompt the customer to confirm the purchase. In this example, transportation provider computing device 116 or TC computing device 150 may receive, from user computing device 114, an authorization request message including the confirmation of purchase. In response to receiving the authorization request message, transportation provider computing device 116 or TC computing device 150 may transmit the authorization request message to payment network 110, which transmits the authorization request message to issuer computing device 122 for processing (e.g., approval or denial of the transaction/purchase). In response to processing the authorization request message, issuer computing device 122 generates and transmits an authorization response message to transportation provider computing device 116 and/or TC computing device 150 via payment network 110. The authorization response message includes an approval or denial of the transaction. If the authorization response message includes the approval, transportation provider computing device 116 or TC computing device 150 may validate the ticket, generate validation data upon determining that the ticket is valid for use, and transmit the validation data with the authorization response message to user computing device 114.

In yet another example, the transportation provider may be a ride sharing provider (e.g., Uber®, Lyft®). In one example, a customer desiring to use a ride sharing vehicle may purchase the trip ahead of time using the TC service or a software application of the ride sharing provider (e.g., ride sharing application). User computing device 114 (e.g., mobile device) of the customer stores the trip information into a digital wallet or the ride sharing application. Subsequently, the customer may request a ride sharing vehicle using the TC application or the ride sharing application. When the customer enters or is at the ride sharing provider's geo-fence (e.g., the customer is proximate and/or enters the ride sharing provider's vehicle), user computing device 114 may detect, using the TC application, the ride sharing provider's geo-fence and establish communication with transportation provider computing device 116 (e.g., a ride sharing computing device) directly or via TC computing device 150 using the communication network signals, as discussed above with respect to the subway system example. User computing device 114 is configured to transmit, directly or via TC computing device 150 using the communication network signals, travel data associated with the pre-purchased ticket to transportation provider computing device 116. In the example embodiment, TC computing device 150 validates the purchased trip, using a similar process as discussed above with respect to the subway system example. Subsequently, TC computing device 150 transmits the validation data to user computing device 114 via transportation provider computing device 116, or separately to user computing device 114 and transportation provider computing device 116. In some embodiments, transportation provider computing device 116, in response to receiving the travel data, validates the purchased trip, using a similar process as discussed above with respect to the subway system example. Subsequently, transportation provider computing device 116 transmits validation data to user computing device 114 directly or via TC computing device 150 using the communication network signals.

In another example, when a customer desiring to get a ride sharing vehicle does not purchase the trip ahead of time, the customer may purchase the trip at the ride sharing provider's geo-fence via user computing device 114. When the customer enters the ride sharing provider's geo-fence, user computing device 114 may detect the ride sharing provider's geo-fence and establish communication with the ride sharing computing device directly or via TC computing device 150 using the communication network signals. In this example, transportation provider computing device 116 or TC computing device 150 may validate the ticket at the time of purchase, generate validation data upon determining that the ticket is valid for use, and transmit the validation data with the authorization response message to the user computing device, using a similar process as described above with respect to the subway example.

In the example embodiment, the TC application is configured to track user computing device 114 location to verify whether user computing device 114 remains within the transportation provider's geo-fence. Whether the transportation provider is a subway system, a ride sharing provider, or other type of transportation provider, TC computing system 100 is configured to track each leg of a customer's trip and aggregate the travel data. Stated differently, TC computing system 100 enables each customer to ride the same or different transportation providers while keeping track of each leg for each customer. For example, two customers (e.g., a first customer and a second customer) may ride a subway from point A to point B, and get a vehicle from a ride sharing provider from point C to point E. However, if the first customer is dropped off at point D, which is between point C and E, and the second customer is dropped off at point E, the trip of the first customer would include points A, B, C, and D, whereas the trip of the second customer would include points A, B, C, D, and E. Therefore, each customer would purchase a trip according to each respective leg of the trip travelled by each customer. TC computing device 150 may automatically split the fare for each shared leg of the trip, for example, according to transportation provider rules.

In certain embodiments, a customer may purchase an open trip. For example, a customer may purchase an open trip either ahead of time or at the transportation provider location. The open trip is validated after user computing device 114 detects a transportation provider's geo-fence, as described above, and the customer initiates the trip. In the case of an open trip, the trip is validated using a pre-authorization response message. That is, the pre-authorization response message places a hold on the customer's account for a specified amount based on a projected purchase amount. For example, a customer and/or a transportation provider may set the specified amount with TC computing device 150 at the time of registration, at the time of purchasing a trip, and/or at the time of updating customer or transportation provider information with the TC service. Once the customer initiates the trip, user computing device 114, using the TC application, is configured to track the location of user computing device 114 and verify that user computing device 114 remains inside the transportation provider's geo-fence. Once TC application on user computing device 114, detects that user computing device 114 is exiting the transportation provider's geo-fence, the TC application or user computing device 114 is configured to record the exit location (e.g., the destination location of the trip) as part of the travel data. The TC application is configured to transmit the destination location and any additional remaining travel data to TC computing device 150 directly or via transportation provider computing device 116. TC computing device 150 stores the destination location as part of the travel data.

In the example embodiment, TC computing device 150 is configured to compute the purchase amount of the trip using the travel data, and particularly the destination location (e.g., the destination location may be known when the trip is purchased or when the trip at the time the customer exits the transportation provider's geo-fence in the case of an open trip). In some embodiments, TC computing device 150 is configured to transmit the computed purchase amount to payment network 110 for processing the purchase in response to receipt of each destination location. In other embodiments, TC computing device 150 is configured to periodically transmit the total computed purchase amount for a plurality of trips completed by a customer during a predefined period of time (e.g., a few hours, a day, few days, a week, etc.). For example, a customer, who desires to go from point A to point D, may have to enter and exit several transportation providers' geo-fences, for example at points B and C, to arrive at point D. In this example, TC computing device 150 is configured to receive travel data when the customer, and more specifically user computing device 114, enters a first geo-fence at point A, exits the first geo-fence at point B (e.g., a first leg of the trip), enters a second geo-fence at point C, and exits the second geo-fence at point D (e.g., a second leg of the trip). In some embodiments, the customer may use the same transportation provider throughout the trip. In other embodiments, the customer may use different transportation providers throughout the trip.

Figure 2:
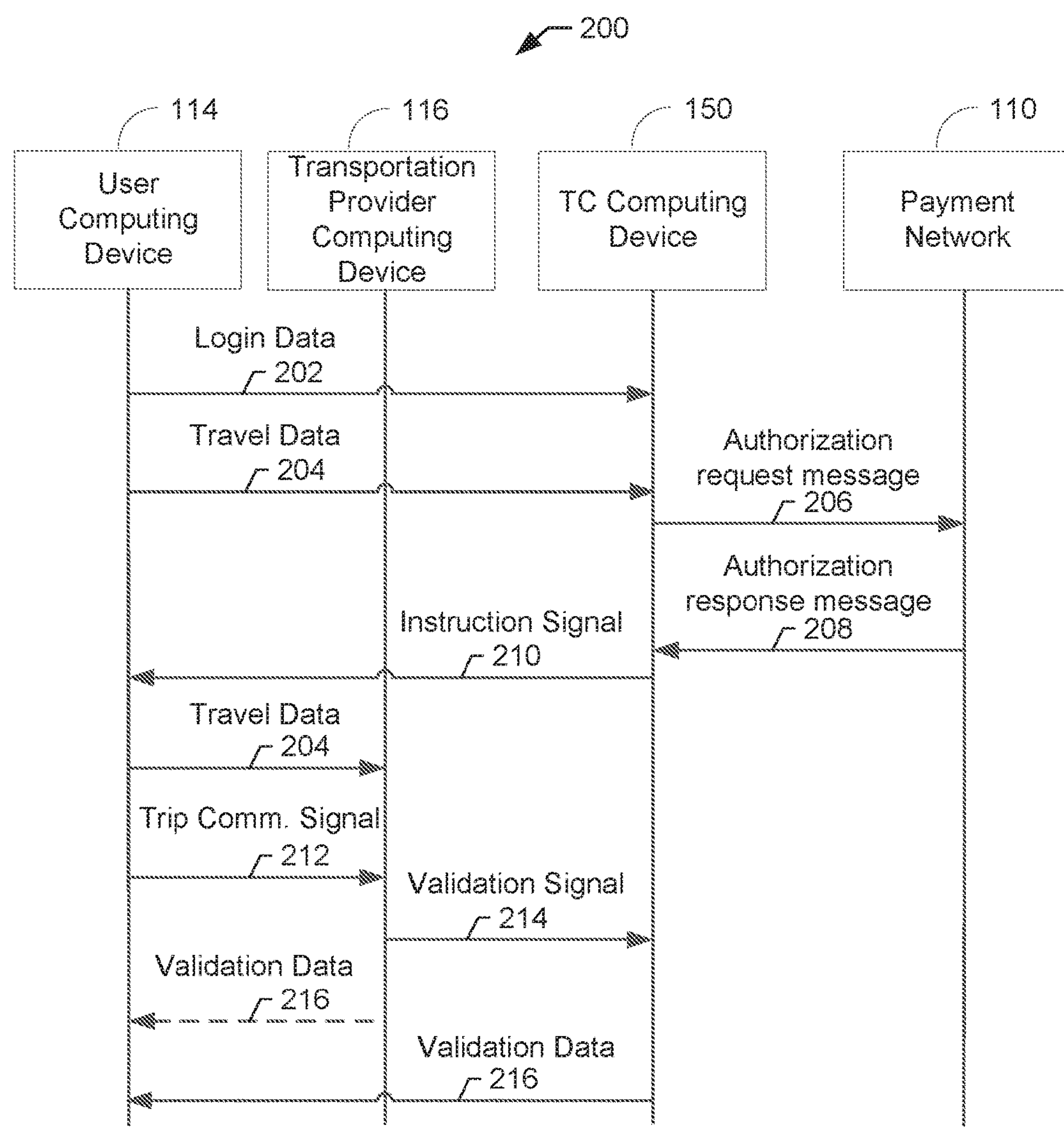

FIG. 2 is an example data flow diagram 200 for a pre-purchased trip implemented using transportation controller (TC) computing system 100 (shown in FIG. 1). In the example, a customer purchases a trip from a remote location (e.g., a location outside the transportation provider's geo-fence). The customer initiates the purchase (e.g., transaction) by accessing the TC service via, for example, a computer browser and/or a TC application included in user computing device 114. The customer may initiate the transaction by inputting login data 202 and travel data 204 into the TC application. For example, the customer may input login data 202, as described above, for authentication by TC computing device 150 against previously submitted registration data of the customer. The customer may also input travel data 204 including a number of trips, a departure location, a destination location, a transportation provider identification, a date and time of departure, and/or other information related to the trip. The inputted login data 202 and travel data 204 are transmitted by user computing device 114 to TC computing device 150.

In the example embodiment, in response to TC computing device 150 receiving the login data 202 and travel data 204, TC computing device 150 may store the received data within a TC database, such as database 120 (shown in FIG. 1). TC computing device 150 may also transmit transaction data derived from login data 202 and travel data 204 in an authorization request message 206 to payment network 110 for processing the transaction associated with the trip(s) being purchased. Payment network 110 may communicate with issuer computing device 122 (shown in FIG. 1), which determines whether the user's payment account is in good standing, and whether the cost of the pre-purchased trip is covered by the user's credit line. Issuer bank 122 then returns an authorization response message 208 which is forwarded by payment network 110 to TC computing device 150.

In response to authorization of the transaction, TC computing device 150 sends an instruction signal 210 to the TC application on user computing device 114 to store travel data 204 within user computing device 114 digital wallet. In some embodiments, instruction signal 210 is sent immediately after receipt of authorization response message 208. In other embodiments, instruction signal 210 is sent at any suitable time. The travel data may be stored in the digital wallet in the form of a digital ticket pass.

In other embodiments, instruction signal 210 may instruct the TC application to establish communication with a transportation provider's software application included in user computing device 114, and transmit travel data 204 present on user computing device 114 to the transportation provider's software application, which stores travel data 204 in advance of the trip. In yet other embodiments, instruction signal 210 may instruct the TC application to establish communication with transportation computing device 116 and transmit travel data 204 present on user computing device 114 to transportation computing device 116, which stores the travel data 204 in advance of the trip. In other embodiments, instruction signal 210 instructs the TC application to store travel data 204 in any fashion that enables the trip to be validated when user computing device 114 detects the transportation provider's geo-fence.

At the time of the trip, transportation provider computing device 116 is configured to validate a pre-purchased trip. In some embodiments, user computing device 114 sends a trip commencement signal 212 to transportation provider computing device 116. In response to trip commencement signal 212, transportation provider computing device 116 validates the pre-purchased trip. For example, trip commencement signal 212 includes travel data 204 of the purchased trip from the digital wallet or transportation provider's software application included in user computing device 114. For another example, in response to trip commencement 212, transportation provider computing device 116 retrieves travel data 204 for the identified trip that was previously sent, as discussed above. User computing device 114 may sent trip commencement signal 212 to transportation provider computing device 116 directly or via the TC computing device 150 using the communication network signals.

In some embodiments, the TC application is configured to automatically send trip commencement signal 212 upon detection of the transportation provider's geo-fence. Alternatively, the user may manually cause the TC application to transmit trip commencement signal 212. In response to trip commencement signal 212, transportation provider computing device 116 may parse the received the travel data to determine whether the purchased trip is valid, for example, by identifying the date and time of the trip. In one example, a trip including a departure of Apr. 20, 2019 may not be validated on Apr. 19, 2019. Similarly, a trip including a departure date and time that has expired cannot be validated. In another example, transportation provider computing device 116 may validate only trips that start/depart within a predefined period of time after receipt of trip commencement signal 212. In this case, for example, a trip including a departure of Apr. 20, 2019 at 2:00 p.m. may not be validated in response to trip commencement signal 212 received before Apr. 20, 2019 at 8:00 a.m. In the example embodiment, transportation provider computing device 116 sends a validation signal 214 to TC computing device 150. In some embodiments, transportation provider computing device 116 validates the trip independently and validation signal 214 is a confirmation signal. Alternatively, validation signal 214 causes TC computing device 150 to participate in the validation process with transportation provider computing device 116. In response to successful validation, one of the transportation provider computing device 116 and TC computing device 150 generates validation data 216 and transmits validation data 216 to user computing device 114. For example, transportation provider computing device 116 may transmit validation data 216 to user computing device 114 directly or via TC computing device 150 using the communication network signals. TC computing device 150 may store validation signal 214 and/or validation data 216 for reporting to the user in, for example, a summary of a multi-leg trip. In response to the successful validation, the user completes the pre-purchased trip with the transportation provider. Validation signal 214 and/or validation data 216 may include instructions causing user computing device 114 to display validation data 216 to, for example, a train conductor or ride-share vehicle driver to confirm that the user has successfully purchased the trip.

Figure 3:
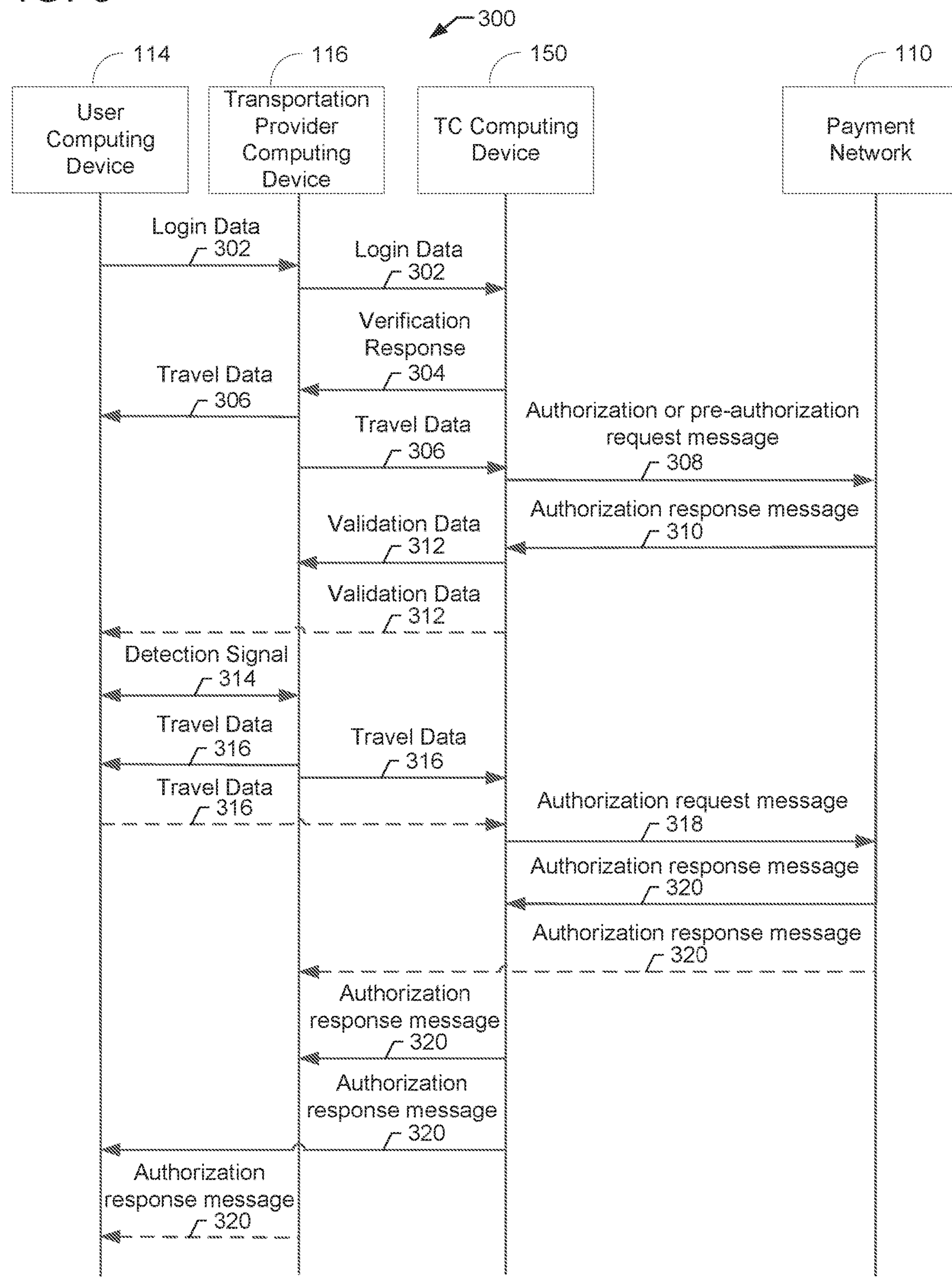

FIG. 3 is an example data flow diagram 300 for an on-site purchase of a trip at a transportation provider's location (a location at or inside the transportation provider's geo-fence). Flow diagram 300 is implemented using the transportation controller (TC) computing system 100 (shown in FIG. 1). In the example embodiment, user computing device 114 provides login data 302 to TC computing device 150. A customer may manually initiate the purchase of the trip via TC computing device 150, as described above, or user computing device 114 may automatically initiate the purchase by accessing the TC service via the TC application upon user computing device 114 detecting the transportation provider's geo-fence. User computing device 114 may detect the transportation provider's geo-fence and establish communication with transportation provider computing device 116 using communication network signals. In the example embodiment, user computing device 114 is configured to transmit login data 302 to transportation provider computing device 116. Subsequently, transportation provider computing device 116 transmits login data 302 to TC computing device 150 for verification or authentication of the customer's credentials. Alternatively, user computing device 114 transmits login data 302 directly to TC computing device 150. Upon verifying the customer, TC computing device 150 transmits back the login data, including a verification response 304 to transportation provider computing device 116, which then transmits travel data 306 to TC computing device 150 and user computing device 114. For example, travel data 306 includes geo-fence location identifiers identifying locations where the customer crossed transportation providers' geo-fences (e.g., entry geo-fence ID, exit geo-fence ID), date and time of entry/exit, duration of each customer trip, and/or transaction data including a transaction amount (e.g., fare fee amount). Travel data 306 may be transmitted first to user computing device 114, which may be configured to forward travel data 306 to TC computing device 150.

In the example embodiment, TC computing device 150 is configured to parse login data 302 and travel data 306 to identify transaction data and determine whether a destination location is included in travel data 306. If travel data 306 includes a destination location, TC computing device 150 is configured to store the destination location within a database, such as database 120 (shown in FIG. 1), and determine that the trip is a closed trip. If travel data 306 does not include a destination location, TC computing device 150 is configured to determine that the trip is an open trip. Upon determining the type of trip (e.g., closed or open), TC computing device 150 is configured to transmit the transaction data in an authorization request or hold message 308 to payment network 110 for processing the purchase (e.g., the transaction), as described below. More specifically, the transaction data may be transmitted in the form of an authorization request message if the total fee is known at the time of purchase (e.g., a destination location is known), or in the form of an authorization hold message (e.g., pre-authorization request message) if the final fee is not yet known (e.g., a destination location is not yet known). Payment network 110 communicates with issuer computing device 122 (shown in FIG. 1), as described above, and receives authorization response message 310 from issuer computing device 122. Upon receiving a positive result in authorization response message 310, TC computing device 150 is configured to send validation data 312 to transportation provider computing device 116 and/or user computing device 114. TC computing device 150 may store validation data 312 for reporting to the user in, for example, a summary of a multi-leg trip. In response to the successful validation, the user may commence the trip with the transportation provider. Validation data 312 may include instructions causing user computing device 114 to display validation data 312 to, for example, a train conductor or ride-share vehicle driver to confirm that the user has successfully purchased the trip.

In the example embodiment, the TC application is configured to track user computing device 114 location to verify whether user computing device 114 remains within the transportation provider's geo-fence, as described above. For example, when a customer exits a transportation provider's geo-fence, TC application on user computing device 114 detects, via detection signals 314, that user computing device 114 is exiting the transportation provider's geo-fence. Detection signals 314 may be transmitted from user computing device 114 to transportation provider computing device 116, and/or from transportation provider computing device 116 to user computing device 114. In response to establishing communication between user computing device 114 and transportation provider computing device 116 via detection signal 314, transportation provider computing device 116 is configured to transmit travel data 316, including the exit location (e.g., the destination location of the trip or exit geo-fence identifier), to user computing device 114 and/or TC computing device 150. Once user computing device 114 receives travel data 316, the TC application or user computing device 114 is configured to record the exit location as part of travel data 316. The TC application is configured to transmit the exit location and any additional remaining travel data 316 to TC computing device 150 directly or via transportation provider computing device 116.

Whether the transportation provider is a subway system, a ride sharing provider, or other type of transportation provider, TC computing system 100 is configured to track each leg of a customer's trip and aggregate travel data 316. Stated differently, TC computing system 100 enables each customer to ride the same or different transportation providers while keeping track of each leg for each customer, as described above. Therefore, each customer is able to purchase a trip according to each respective leg of the trip travelled by each customer. TC computing device 150 may automatically split the fare for each shared leg of the trip, for example, according to transportation provider rules, and compute the purchase amount of the trip for each customer separately, so that payment network 110 may process each purchase for each customer independently.

In embodiments where the customer purchases a closed trip, TC computing device 150 is configured to compare the exit location included in travel data 306 to a stored destination location, and determine that the customer has completed his or her trip. In embodiments where the customer purchases an open trip, TC computing device 150 is configured to store the exit location as part of travel data 316. TC computing device 150 is also configured to compute the purchase amount of the trip using travel data 316, and particularly the exit location. In the case of, for example, an open trip, TC computing device 150 is further configured to transmit the computed purchase amount into an authorization request message 318 to payment network 110 for processing the purchase in response to receipt of each exit location. In other embodiments, TC computing device 150 is configured to periodically transmit authorization request message 318 including the total computed purchase amount for each travel provider for a plurality of trips completed by a customer during a predefined period of time (e.g., a few hours, a day, few days, a week, etc.). For example, a customer, who desires to go from point A to point D, may have to enter and exit several transportation providers' geo-fences, for example at points B and C, to arrive at point D. In this example, TC computing device 150 is configured to receive travel data 316 when the customer, and more specifically user computing device 114, enters a first geo-fence at point A, exits the first geo-fence at point B (e.g., a first leg of the trip), enters a second geo-fence at point C, and exits the second geo-fence at point D (e.g., a second leg of the trip). In some embodiments, the customer may use the same transportation provider throughout the trip. In other embodiments, the customer may use different transportation providers throughout the trip.

In response to receiving authorization request message 318, payment network 110 may transmit authorization request message 318 to issuer computing device 122 for processing (e.g., approval or denial of the transaction/purchase). In response to processing authorization request message 318, issuer computing device 122 generates and transmits authorization response message 320 to transportation provider computing device 116 and/or TC computing device 150. Authorization response message 320 includes an approval or denial of the transaction. If authorization response message 320 includes the approval, TC computing device 150 may include a flag into authorization response message 320 indicating that the trip has been completed. TC computing device 150 is configured to forward authorization response message 320 to user computing device 114 and transportation provider computing device 116.

Figure 4:
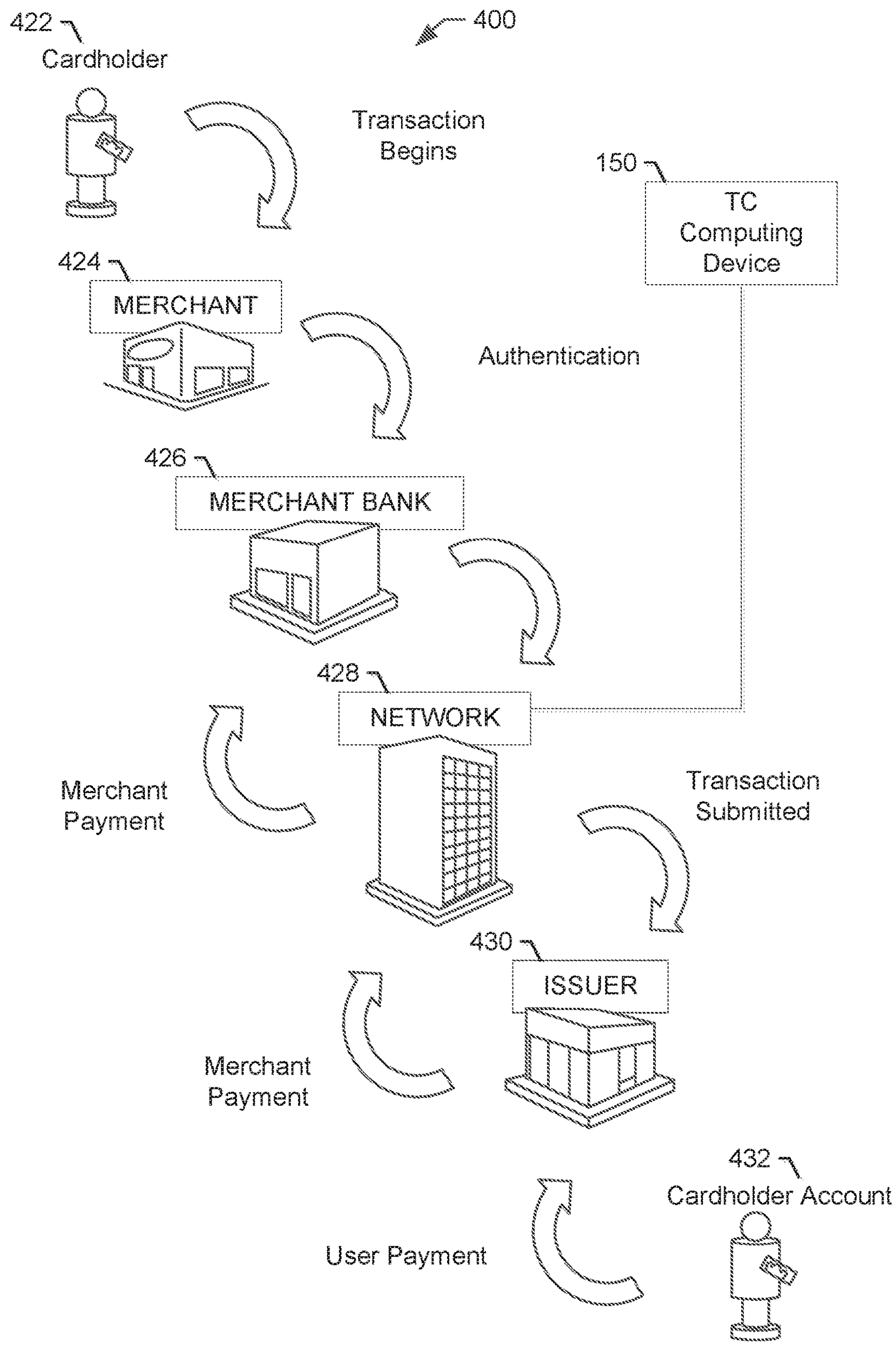

FIG. 4 is a schematic diagram illustrating an example multi-party transaction card industry system 400 for enabling ordinary payment-by-card transactions, including payment-by-card transactions made by cardholders, such as cardholder 422, using user computing devices, such as user computing device 114 (shown in FIG. 1), to initiate transactions with a merchant, in which merchants 424 (e.g., a transportation provider associated with transportation provider computing device 116 (shown in FIG. 1)), and card issuers 430 (e.g., a card issuer associated with issuer computing device 122 (shown in FIG. 1)) do not need to have a one-to-one special relationship. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

In a typical transaction card system, a financial institution called the "issuer" issues a transaction card, such as a credit card, to a customer or cardholder 422, who uses the transaction card to tender payment for a purchase from a merchant 424. Cardholder 422 may purchase goods and services ("products") at merchant 424. Cardholder 422 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 424 must normally establish an account with a financial institution that is part of the financial payment system. This financial institution is usually called the "merchant bank," the "acquiring bank," or the "acquirer." When cardholder 422 tenders payment for a purchase with a transaction card or virtual transaction card, merchant 424 requests authorization from a merchant bank 426 for the amount of the purchase (e.g., transaction amount). The request may be performed over the telephone or electronically, but is usually performed through the use of a point-of-sale terminal, which reads cardholder's 422 account information from a magnetic stripe, a chip, or embossed characters on the transaction card and communicates electronically with the transaction processing computers of merchant bank 426. Merchant 424 receives cardholder's 422 account information as provided by cardholder 422. Alternatively, merchant bank 426 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 428 (e.g., payment network 110 (shown in FIG. 1)), computers of merchant bank 426 or merchant processor will communicate with computers of an issuer bank 430 to determine whether cardholder's 422 account 432 is in good standing and whether the purchase is covered by cardholder's 22 available credit line. Based on these determinations, the request for authorization will be declined or accepted in an authorization response message. If the request is accepted, an authorization code is issued to merchant 424.

When a request for authorization is accepted, the available credit line of cardholder's 422 account 432 is decreased. Normally, a charge for a payment card transaction is not posted immediately to cardholder's 422 account 432 because bankcard associations, such as MasterCard International Incorporated®, have promulgated rules that do not allow merchant 424 to charge, or "capture," a transaction until products are shipped or services are delivered. However, with respect to at least some debit card transactions, a charge may be posted at the time of the transaction. When merchant 424 ships or delivers the products or services, merchant 424 captures the transaction by, for example, appropriate data entry procedures on the point-of-sale terminal. This may include bundling of approved transactions daily for standard retail purchases. If cardholder 422 cancels a transaction before it is captured, a "void" is generated. If cardholder 422 returns products after the transaction has been captured, a "credit" is generated. Interchange network 428 and/or issuer bank 430 stores the transaction card information, such as a type of merchant, amount of purchase, date of purchase, in a database 120 (shown in FIG. 1).

After a purchase has been made, a clearing process occurs to transfer additional transaction data related to the purchase among the parties to the transaction, such as merchant bank 426, interchange network 428, and issuer bank 430. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including transportation controller (TC) computing device 150. In the example embodiment, interchange network 428 provides such transaction data and additional transaction data. In alternative embodiments, any party may provide such data to TC computing device 150.

After a transaction is authorized and cleared, the transaction is settled among merchant 424, merchant bank 426, and issuer bank 430. Settlement refers to the transfer of financial data or funds among merchant's 424 account, merchant bank 426, and issuer bank 430 related to the transaction. Usually, transactions are captured and accumulated into a "batch," which is settled as a group. More specifically, a transaction is typically settled between issuer bank 430 and interchange network 428, and then between interchange network 428 and merchant bank 426, and then between merchant bank 426 and merchant 424.

Figure 5:
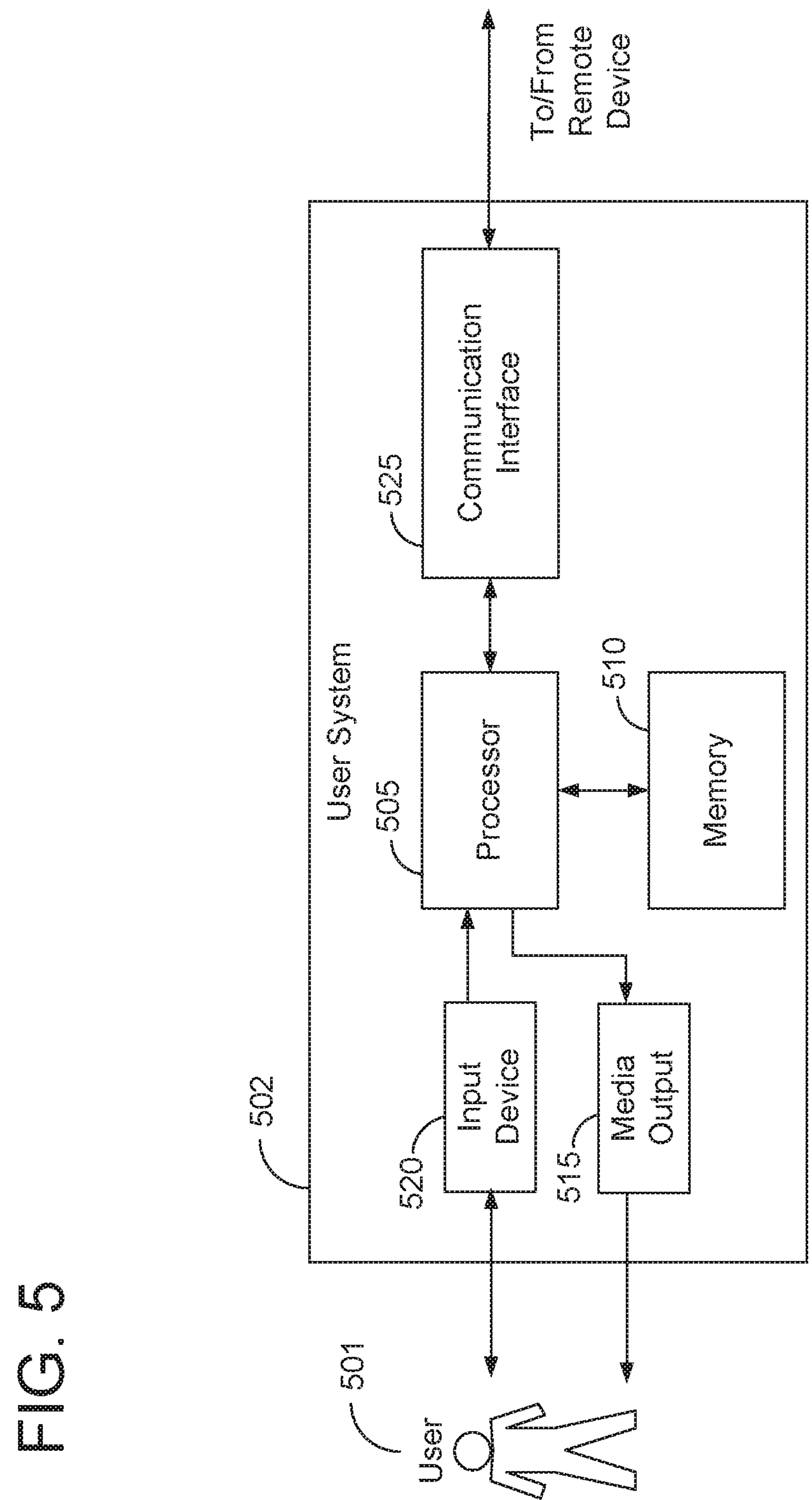

FIG. 5 illustrates an example configuration of a user system 502 operated by a user 501, such as a customer or cardholder 422 (shown in FIG. 4). In the example embodiment, user system 502 is similar to user computing device 114 and transportation provider computing device 116 (both shown in FIG. 0.1), and may be used by user 501 to interact with TC computing system 100 (shown in FIG. 1). More specifically, user system 502 may be used to access a TC service to enable TC computing system 100 to monitor user system's 502 location and trigger location-based events using geo-fencing. In the example embodiment, user system 502 includes a processor 505 for executing instructions. In some embodiments, executable instructions are stored in a memory area 510. Processor 505 may include one or more processing units, for example, a multi-core configuration. Memory area 510 is any device allowing information such as executable instructions and/or written works to be stored and retrieved. Memory area 510 may include one or more computer readable media.

User system 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device, a liquid crystal display (LCD), organic light emitting diode (OLED) display, or "electronic ink" display, or an audio output device, a speaker or headphones.

In some embodiments, user system 502 includes an input device 520 for receiving input from user 501. Input device 520 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 515 and input device 520. User system 502 may also include a communication interface 525, which is communicatively couplable to a remote device, such as TC computing device 150 and/or transportation provider computing device 116. Communication interface 525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 510 are, for example, computer readable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from TC computing system 100. A client application allows user 501 to interact with a server application from TC computing system 100, such as TC service.

Figure 6:
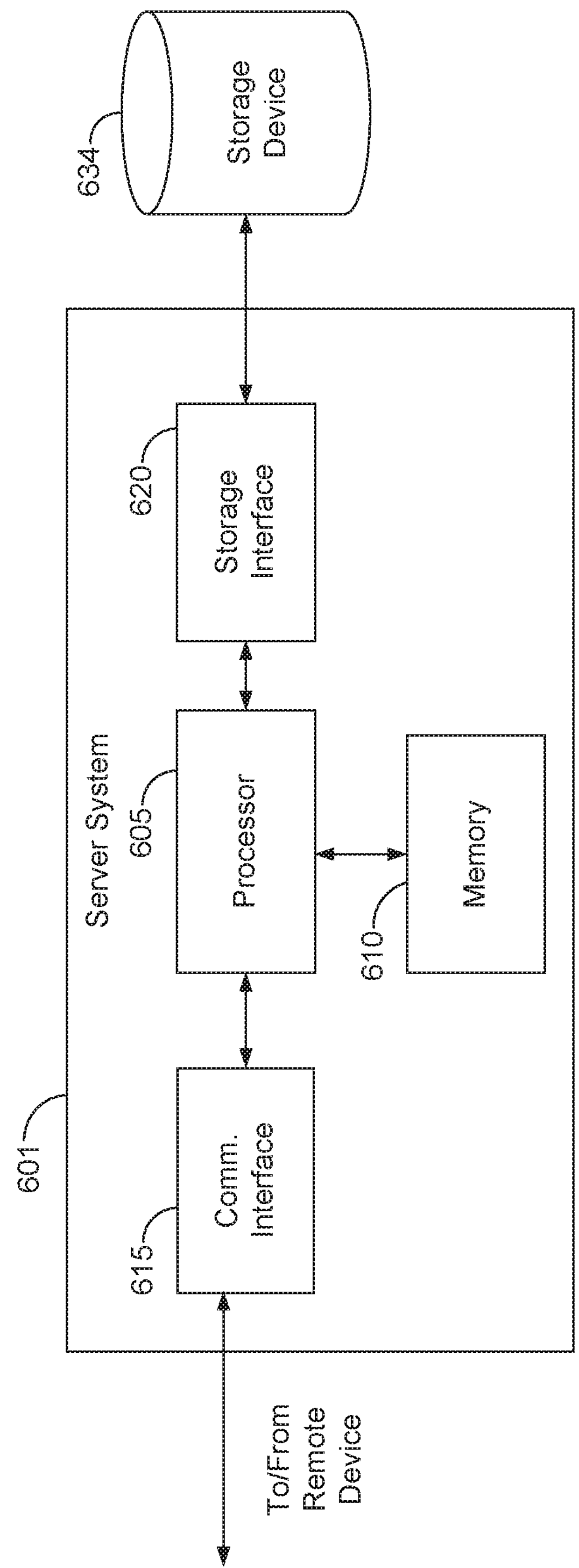

FIG. 6 illustrates an example configuration of a server system 601 such as server 112 (shown in FIG. 1). Server system 601 may include, but is not limited to, database server 118 (shown in FIG. 1). In the example embodiment, server system 601 is configured to monitor computing device (e.g., user computing device 114 (shown in FIG. 1)) location and trigger location-based events using geo-fencing.

Server system 601 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on server system 601, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 605 is operatively coupled to a communication interface 615 such that server system 601 is capable of communicating with a remote device such as user system 502 (shown in FIG. 5) or another server system 601. For example, communication interface 615 may receive requests from user computing device 114 or transportation provider computing device 116 via the Internet, as illustrated in FIG. 1.

Processor 605 may also be operatively coupled to a storage device 634. Storage device 634 is any computer-operated hardware suitable for storing and/or retrieving data. In some embodiments, storage device 634 is integrated in server system 601. For example, server system 601 may include one or more hard disk drives as storage device 634. In other embodiments, storage device 634 is external to server system 601 and may be accessed by a plurality of server systems 601. For example, storage device 634 may include multiple storage units such as hard disks or solid state disks in a redundant array of inexpensive disks (RAID) configuration. Storage device 634 may include a storage area network (SAN) and/or a network attached storage (NAS) system.

In some embodiments, processor 605 is operatively coupled to storage device 634 via a storage interface 620. Storage interface 620 is any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Memory area 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
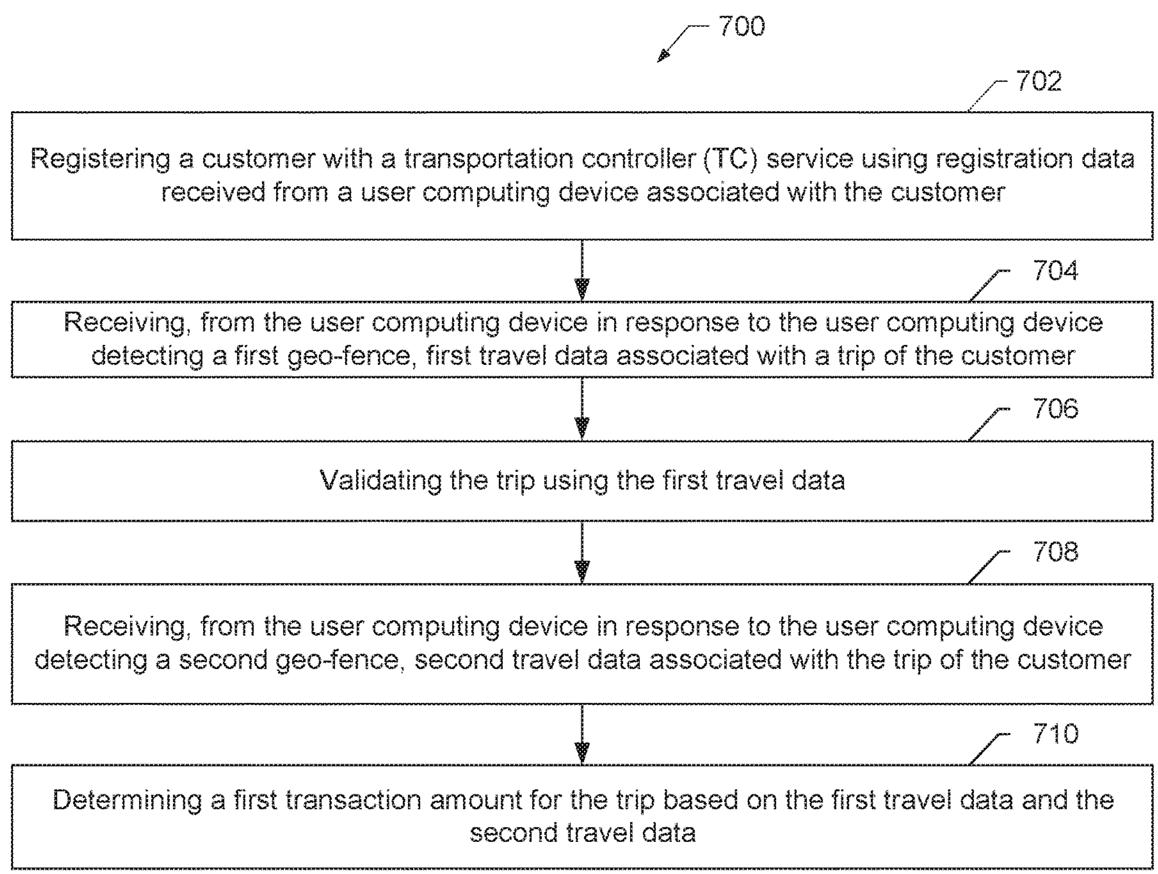

FIG. 7 is an example flow diagram illustrating a method flow 700 by which transportation controller (TC) computing system 100 monitors the location of a user computing device, such as user computing device 114, and triggers location-based events using geo-fencing, using at least one transportation controller (TC) computing device 150 in communication with a database, such database 120 (all shown in FIG. 1). Method 700 includes registering 702 a customer with a transportation controller (TC) service using registration data received from a user computing device associated with the customer. Method 700 also includes receiving 704, from the user computing device in response to the user computing device detecting a first geo-fence, first travel data associated with a trip of the customer, and validating 706 the trip using the first travel data. Method 700 further includes receiving 708, from the user computing device in response to the user computing device detecting a second geo-fence, second travel data associated with the trip of the customer, and determining 710 a first transaction amount for the trip based on the first travel data and the second travel data.

Figure 8:
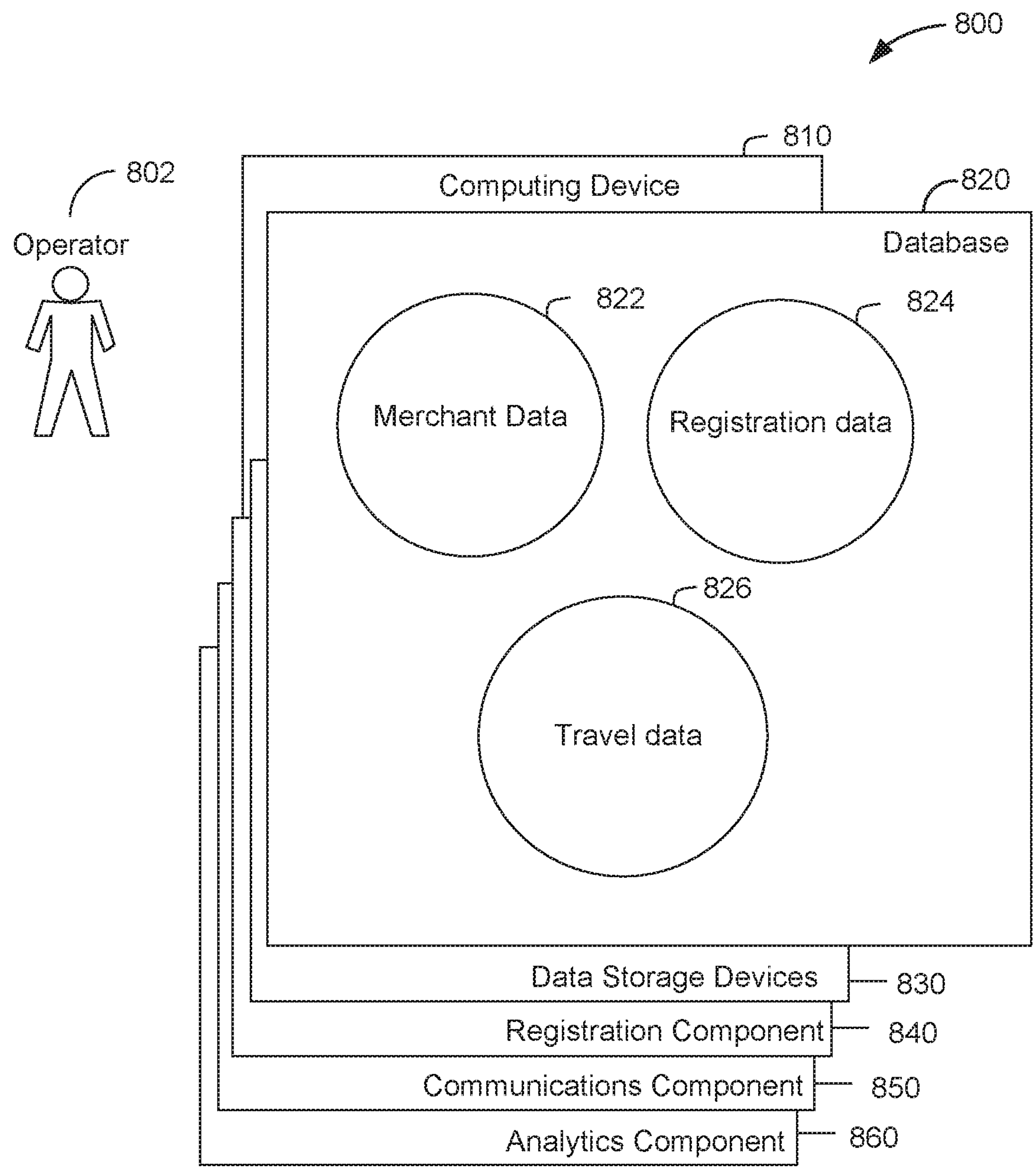

FIG. 8 is a diagram 800 of computer components of one or more example computing devices that may be used in transportation controller (TC) computing system 100, as shown in FIG. 1. In some embodiments, computing device 810 is used to implement transportation controller (TC) computing device 150 (shown in FIG. 1). The computer components may be used to monitor the location of a user computing device, such as user computing device 114 (shown in FIG. 1), and trigger location-based events using geo-fencing. Operator 802 (such as a user operating TC computing device 150) may access computing device 810 in order to service computing device 810. In some embodiments, database 820 is similar to database 120 and/or database 118 (both shown in FIG. 1). Database 820 may be coupled with several separate components within computing device 810, which perform specific tasks. In the example embodiment, database 820 includes merchant data 822, registration data 824, and travel data 826.

Computing device 810 includes database 820, as well as storage devices 830, for storing data within database 820, such as storing merchant data 822, registration data 824, and travel data 826. Computing device 810 also includes registration component 840 for registering 702 (shown in FIG. 7) a customer with a transportation controller (TC) service using registration data received from user computing device 114 associated with the customer. Computing device 810 further includes communications component 850 for receiving 704 (shown in FIG. 7), from user computing device 114 in response to user computing device 114 detecting a first geo-fence, first travel data associated with a trip of the customer, and receiving 708 (shown in FIG. 7), from user computing device 114 in response to user computing device 114 detecting a second geo-fence, second travel data associated with the trip of the customer.

Computing device 810 further includes analytics component 860 for validating 706 (shown in FIG. 7) the trip using the first travel data, and determining 710 (shown in FIG. 7) a first transaction amount for the trip based on the first travel data and the second travel data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, computer-executable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible and fast system for various aspects of fraud analysis for registration of merchants with acquirer banks. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the transportation controller (TC) computing device are described herein as including general processing and memory devices, it should be understood that the TC computing device is a specialized computer configured to perform the steps described herein for generating and provisioning secure tokens over a communications network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

What is claimed is:

1. A transportation controller (TC) computing system for monitoring a user computing device location and triggering location-based events using geo-fencing, the TC computing system comprising at least one transportation controller (TC) computing device including at least one processor communicatively coupled to a database, the at least one processor configured to:

receive, from one or more transportation provider computing devices associated with one or more transportation providers, merchant data associated with each of the one or more transportation providers, and register the one or more transportation providers with a transportation controller (TC) service based on the merchant data;

register a customer with the TC service using registration data received from a user computing device associated with the customer;

receive, from the user computing device in response to the user computing device detecting a first geo-fence, first travel data associated with a trip of the customer and a first transportation provider of the one or more transportation providers;

validate the trip using the first travel data;

receive, from the user computing device in response to the user computing device detecting a second geo-fence, second travel data associated with the trip of the customer; and determine a first transaction amount for the trip based on the first travel data and the second travel data.

2. The TC computing system of claim 1, wherein the at least one processor is further configured to include computer-executable code into a transportation controller (TC) application, wherein the computer-executable code enables communication between one or more user computing devices and one or more transportation provider computing devices.

3. The TC computing system of claim 1, wherein the at least one processor is further configured to register the first transportation provider with the TC service using the merchant data associated with the first transportation provider and received from a first transportation provider computing device associated with the first transportation provider.

4. The TC computing system of claim 1, wherein the first geo-fence and the second geo-fence are associated with the first transportation provider.

5. The TC computing system of claim 1, wherein the at least one processor is further configured to:
- receive, from the user computing device in response to the user computing device detecting a third geo-fence, third travel data associated with the trip of the customer;
- receive, from the user computing device in response to the user computing device detecting a fourth geo-fence, fourth travel data associated with the trip of the customer, wherein the third travel data and fourth travel data are with a second transportation provider;
- determine a second transaction amount for the trip based on the third travel data and the fourth travel data; and
- compute a total transaction amount for the trip of the customer by aggregating the first transaction amount and the second transaction amount.

6. The TC computing system of claim 1, wherein the at least one processor is further configured to transmit the first transaction amount in an authorization request message to a payment network.

7. The TC computing system of claim 1, wherein the at least one processor is further configured to:
- generate validation data in response to validating the trip;
- transmit the validation data to the user computing device; and
- cause the user computing device to display the validation data.

8. A computer-implemented method for monitoring a user computing device location and triggering location-based events using geo-fencing, the method implemented by at least one transportation controller (TC) computing device including at least one processor communication with a database, said method comprising:
- receiving, from one or more transportation provider computing devices associated with one or more transportation providers, merchant data associated with each of the one or more transportation providers, and registering the one or more transportation providers with a transportation controller (TC) service based on the merchant data;
- registering a customer with the TC service using registration data received from a user computing device associated with the customer;
- receiving, from the user computing device in response to the user computing device detecting a first geo-fence, first travel data associated with a trip of the customer and a first transportation provider of the one or more transportation providers;
- validating the trip using the first travel data;
- receiving, from the user computing device in response to the user computing device detecting a second geo-fence, second travel data associated with the trip of the customer; and
- determining a first transaction amount for the trip based on the first travel data and the second travel data.

9. The method of claim 8, wherein the method further comprises including computer-executable code into a transportation controller (TC) application, wherein the computer-executable code enables communication between one or more user computing devices and one or more transportation provider computing devices.

10. The method of claim 8, wherein the method further comprises registering the first transportation provider with the TC service using the merchant data associated with the first transportation provider and received from a first transportation provider computing device associated with the first transportation provider.

11. The method of claim 8, wherein the first geo-fence and the second geo-fence are associated with the first transportation provider.

12. The method of claim 8, wherein the method further comprises:
- receiving, from the user computing device in response to the user computing device detecting a third geo-fence, third travel data associated with the trip of the customer;
- receiving, from the user computing device in response to the user computing device detecting a fourth geo-fence, fourth travel data associated with the trip of the customer, wherein the third travel data and fourth travel data are with a second transportation provider;
- determining a second transaction amount for the trip based on the third travel data and the fourth travel data; and
- computing a total transaction amount for the trip of the customer by aggregating the first transaction amount and the second transaction amount.

13. The method of claim 8, wherein the method further comprises transmitting the first transaction amount in an authorization request message to a payment network.

14. The method of claim 8, wherein the method further comprises:
- generating validation data in response to validating the trip;
- transmitting the validation data to the user computing device; and
- causing the user computing device to display the validation data.

15. A non-transitory computer-readable storage medium having computer-executable instructions embodied thereon, wherein when executed by at least one transportation controller (TC) computing device including at least one processor in communication with a database, the computer-executable instructions cause the TC computing device to:
- receive, from one or more transportation provider computing devices associated with one or more transportation providers, merchant data associated with each of the one or more transportation providers, and register the one or more transportation providers with a transportation controller (TC) service based on the merchant data;
- register a customer with the TC service using registration data received from a user computing device associated with the customer;
- receive, from the user computing device in response to the user computing device detecting a first geo-fence, first travel data associated with a trip of the customer and a first transportation provider of the one or more transportation providers;
- validate the trip using the first travel data;
- receive, from the user computing device in response to the user computing device detecting a second geo-fence, second travel data associated with the trip of the customer; and
- determine a first transaction amount for the trip based on the first travel data and the second travel data.

16. The computer-readable storage medium of claim 15, wherein the computer-executable instructions further cause the TC computing device to include computer-executable code into a transportation controller (TC) application, wherein the computer-executable code enables communication between one or more user computing devices and one or more transportation provider computing devices.

17. The computer-readable storage medium of claim 15, wherein the computer-executable instructions further cause the TC computing device to register the first transportation provider with the TC service using the merchant data associated with the first transportation provider and received from a first transportation provider computing device associated with the first transportation provider.

18. The computer-readable storage medium of claim 15, wherein the first geo-fence and the second geo-fence are associated with the first transportation provider.

19. The computer-readable storage medium of claim 15, wherein the computer-executable instructions further cause the TC computing device to:

receive, from the user computing device in response to the user computing device detecting a third geo-fence, third travel data associated with the trip of the customer;

receive, from the user computing device in response to the user computing device detecting a fourth geo-fence, fourth travel data associated with the trip of the customer, wherein the third travel data and fourth travel data are with a second transportation provider;

determine a second transaction amount for the trip based on the third travel data and the fourth travel data; and compute a total transaction amount for the trip of the customer by aggregating the first transaction amount and the second transaction amount.

20. The computer-readable storage medium of claim 15, wherein the computer-executable instructions further cause the TC computing device to transmit the first transaction amount in an authorization request message to a payment network.

* * * * *